Figure 1:
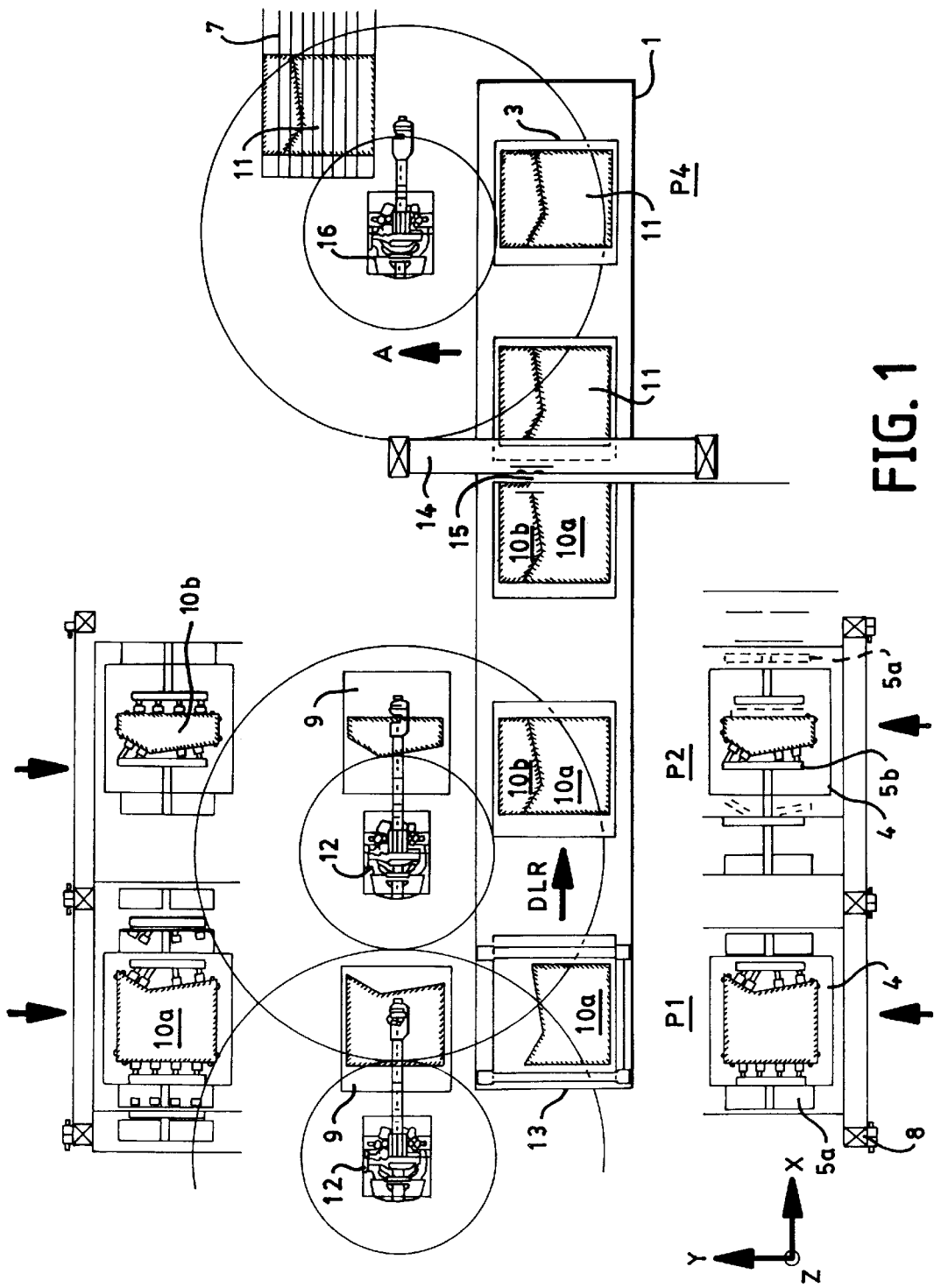

United States Patent [19]
Alber

[11] Patent Number: 6,156,996
[45] Date of Patent: Dec. 5, 2000

[54] PROCESS FOR TRANSPORTATION OF SHEET METAL TO A PROCESSING DEVICE CUTTING AND/OR WELDING OF SHEET METAL, AND AN ARRANGEMENT FOR IMPLEMENTING THE PROCESS

[75] Inventor: Gerhard Alber, Ravensburg, Germany

[73] Assignee: Thyssen Krupp AG, Düsseldorf, Germany

[21] Appl. No.: 08/983,498

[22] PCT Filed: Jun. 22, 1996

[86] PCT No.: PCT/EP96/02720

§ 371 Date: Mar. 20, 1998

§ 102(e) Date: Mar. 20, 1998

[87] PCT Pub. No.: WO97/03787

PCT Pub. Date: Feb. 6, 1997

[30] Foreign Application Priority Data

Jul. 20, 1995 [DE] Germany .......................... 195 26 466

[51] Int. Cl.[7] .......................... B23K 26/00; B23K 26/08
[52] U.S. Cl. .................. 219/121.63; 219/121.82
[58] Field of Search ................. 219/121.63, 121.64, 219/121.67, 121.72, 121.82; 228/4.1, 47.1; 29/464; 83/403.1, 409, 734; 198/339.1, 343.2, 343.1, 443, 459.1, 461.1

[56] References Cited

U.S. PATENT DOCUMENTS

| | | | |
|---|---|---|---|
| 5,098,005 | 3/1992 | Jack | 228/4.1 |
| 5,132,510 | 7/1992 | Klingel et al. | 219/121.82 |
| 5,192,848 | 3/1993 | Miyakawa et al. | 219/121.82 |
| 5,272,311 | 12/1993 | Gilli et al. | 219/121.67 |
| 5,500,507 | 3/1996 | Yoshiaki | 219/121.82 |
| 5,532,450 | 7/1996 | Iwai et al. | 219/121.63 |

FOREIGN PATENT DOCUMENTS 60-30596  2/1985  Japan .

OTHER PUBLICATIONS

Trumpf GmbH & Co. Aug. 1993 System Component Technician Information.

*Primary Examiner*—Samuel M. Heinrich
*Attorney, Agent, or Firm*—McGlew and Tuttle, P.C.

[57] ABSTRACT

The invention relates to a process for cutting and/or welding preferably geometrically differently shaped metal sheets (10a, 10b), preferably sheet-metal panels, of the same or different gauges and straight and/or irregular weld seams, especially for motor vehicle coachwork, with jet tools, in which: a) the metal sheet(s) to be cut and/or at least two sheets to be butt-welded together are fitted and secured on a support (3) in the position to be cut and/or welded together; b) the sheets secured on the support are taken at irregular distances and/or discontinuously in front of the cutting or welding device (15) (machining device), on which c) for cutting and/or welding processes the machining device is moved at least transversely to the direction of transport of the sheets in accordance with the course of the irregular cutting line or weld seam, and in which d) the sheets (10a, 10b) secured to the support (3) are continuously and/or with an optimum spacing moved along beneath the machining device (15) at a speed depending on the cutting or welding rate and/or the course of the cutting line or weld seam, and an appropriately designed processing installation for implementing said process.

11 Claims, 7 Drawing Sheets

PROCESS FOR TRANSPORTATION OF SHEET METAL TO A PROCESSING DEVICE CUTTING AND/OR WELDING OF SHEET METAL, AND AN ARRANGEMENT FOR IMPLEMENTING THE PROCESS

The invention relates to a process and apparatus for cutting and/or welding of sheet metal plates of preferably geometrically differently shaped metal sheets, preferably sheet metal panels of the same or different thickness and straight and/or odd weld seams, and in particular for sheet metal panels of motor vehicle coach work.

Known from EP 0 438 615 A1 is a device for connecting at least two sheet metal plates through at least one weld seam fabricated by a laser beam welding device, whereby pairs of pallets with sheet metal panels lying on them are conveyed side by side on a conveyor unit working in certain cycles and whereby these pallets are moved to a strip-shaped arrest stop and/or ruler where the base side of the sheet metal panels rest against in order to align the sheet metal panels with each other at their front sides and whereby the pallets with the sheet metal panels clamped firmly on them are moved orthogonally to the direction of conveyance of the cycled conveyor unit against each other up to the arrest stop of the sheet metal plate base sides which are to be united by welding. Upon lifting of the sheet metal panels from the pallets the pallets are conveyed back beneath the conveyor track for sheet metal panels through the same conveyor unit to the charging station of the new sheet metal panels.

An essential feature of this known device is that the sheet metal plates to be united by welding are arranged on different pallets and that the pallets must be brought together to allow for uniting the sheet metal plates by welding, whereby the sheet metal plates rise over the pallets in the area of the weld seam so that compression and guide rollers can be located underneath of the weld seam. The movement of both pallets to each other calls for additional facilities and also for time. Moreover the known facility just provides for one conveyance unit mainly running at constant speed for transportation of sheet metal plates lying on pallets from the charging to the discharging station. It does not allow for a continuous transportation of sheet metal plates optimized for gaps, that means running at the smallest possible distance, past the welding device because delays and interruptions are bound to occur on charging and discharging of sheet metal plates on and off the pallets. Furthermore, only weld seams with mainly even or straight run can be fabricated at this status of technology.

Known from DE 33 14 748 C2 is a processing machine for flat workpieces with at least one processing station, among others also for flame cutting of sheet metal panels, whereby workpieces are slideable under a processing station on workpiece sliding devices equipped with retainers. The relevant tools are movable transversely to the sliding direction of workpieces. The sliding devices here serve for transportation of workpieces under and through the processing station. Facilities by which workpieces are conveyed consecutively to the sliding device are not illustrated thereunder.

DE 41 13 295 A1 relates to a device for fabrication of motor car coachwork consisting of a frame rack, a fabrication line, and at least one drum mounted in a pivoting arrangement on a support bed, said drum containing the positioning tools for the car body components. The support bed of the drum here consists of a car which is slideable on a base plate. The problem of a sheet metal plate transportation optimized for gaps, that means at the smallest possible and at a constant distance past the processing installation in the transport direction of the fabrication line is not mentioned thereunder.

Now it is the task of this invention to propose a generic process and a processing installation where those problems outlined at the status of technology do not exist and where sheet metal plates of any shape are firmly positioned on their support bed for processing and where these sheet metal plates are conveyed to the processing station and past them.

The task is solved by providing a plurality of carriers and mounting the plates in a processing position on the carriers at a charging station. Each of the plurality of carriers is moved independently of each other from the processing unit to a synchronizing position after the plates have been mounted on the carriers at the processing position. The carriers are moved from the synchronizing position to and through the processing unit at a synchronous rate which corresponds to a processing rate of the processing unit. The synchronous rate is independent of the moving of the carriers upstream of the synchronizing position and the carriers are moved to optimize the distance between the carriers. This distance between the carriers is optimized so that the distance is a minimum for continuous operation of the processing unit, depending on the operation performed by the processing unit. It is preferable to have the processing unit operate substantially continuously and without interruption of the processing unit.

Process claims 2 to 6 contain purposive supplementary process features. Subclaims 8 to 19 indicate different styles of execution of the welding installation being subject of this invention as per Patent Claim 7.

According to the invention at least one sheet metal plate and/or preliminary sheet metal bar for cutting and at least two or more sheet metal panels and/or preliminary sheet metal bars for welding can be exactly positioned on a carrier so that cutting lines or welding seams taking any optional curve can be fabricated with one or several processing installation(s). Then the sheet metal plates can preferably be positioned consecutively in various stages jointly on one carrier and be clamped firm by utilizing known chucking devices. Depending on the completion of this connection the carriers are moved at irregular distances and/or discontinuously up to and in front of the processing installation. According to the invention several carriers may also dam-up consecutively upstream of the processing installation. Under and through the processing installation the sheet metal plates are then moved continuously and/or optimized for gaps, if possible, that means mainly at the smallest possible distance so that the processing installation which particularly is a laser beam cutting or welding device can cut or weld continuously, if possible without any interruption. The speed of these sheet metal plates through under this processing installation depends on the cutting and welding speed and/or on the optional curve of the cutting line or welding seam and/or cutting lines or welding seams. The processing installation is expediently located at a portal-type bridge spanning over the transport track of the sheet metal plates and can be moved alongside in accordance with the curve of the optionally extending cutting line or welding seam. If several cutting lines or welding seams with a complicated curve or, for example, more than two sheet metal plates are to be cut or welded together at the same time, several processing installations can also be active independently of each other. Upon completion of the cutting or welding procedure the sheet metal plates can be conveyed to a take-off unit, preferably at higher speed, and be lifted there from the carriers at irregular distances and/or discontinuously. Here it is important that a buffer be provided to compensate for delays in take-out, if any, so as to prevent any effects on the cutting and welding procedure.

It turned out to be favourable for transportation of carriers from the charging station to the discharging station and for transportation of empty carriers back to the charging station to implement a rotary system. For well-aimed transportation past the processing installation independently from the main rotary system the pallets with the carriers fixed on them in detachable arrangement and with the sheet metal plates are lifted or lowered through a lifting jack system and connected each to one of two horizontal feed forward axles working in opposite direction to each other. To ensure a continuous conveyance here, too, both feed forward axles are run in opposite direction to each other, that means while one axle moves one carrier forward, the other axle moves empty back to the take-over point. At the end of the cutting or welding procedure the carrier is again lifted and/or lowered through the lifting jack system and disconnected from the feed forward axle and connected to the rotary system.

By way of the positioning the sheet metal plates on a pre-positioning table between stock pile yard and carrier, the position tolerance of sheet metal plates in the X/Y plane can be minimized and above all the transportation time in the transverse conveyor from the stock pile yard to the carrier can be shortened. The sheet metal plates can be held on the carrier either by way of magnetic chuck devices from bottom and/or pneumatically by clamping ledges from above. In the latter case the carrier will arrive with opened chuck devices at the charging station and after positioning of these sheet metal plates these chuck devices will be closed. For magnetic chuck devices the permanently magnetic support bed ledges can be neutralized for insertion of sheet metal plates by connecting a flow of electric power.

To allow for a frequent change of sheet metal plates and for quick adaptation to different shapes of sheet metal plates and/or cutting lines or welding seam curves, it is possible to arrange flexible and/or hinged-connected chucking devices on the carrier. By way of these chucking devices which are variable in their position on the carrier in this simple manner it is possible to largely dispense with a complete exchange of the carrier and/or pallet.

The invention is explained in greater detail by putting examples as illustrated on FIGS. 1 to 6 which are annexed hereto.

Figure 2:
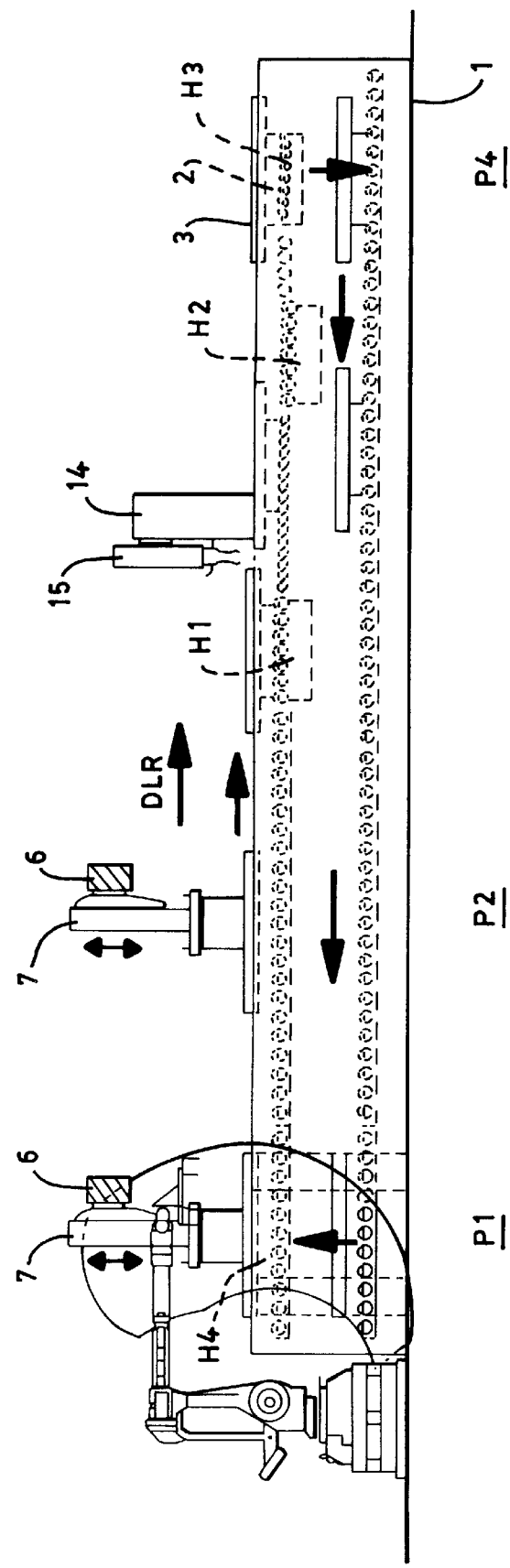

FIG. 1 plan view of the essential parts of the processing installation being the subject of this invention FIG. 2 vertical section through the rotary system 1

Figure 3:
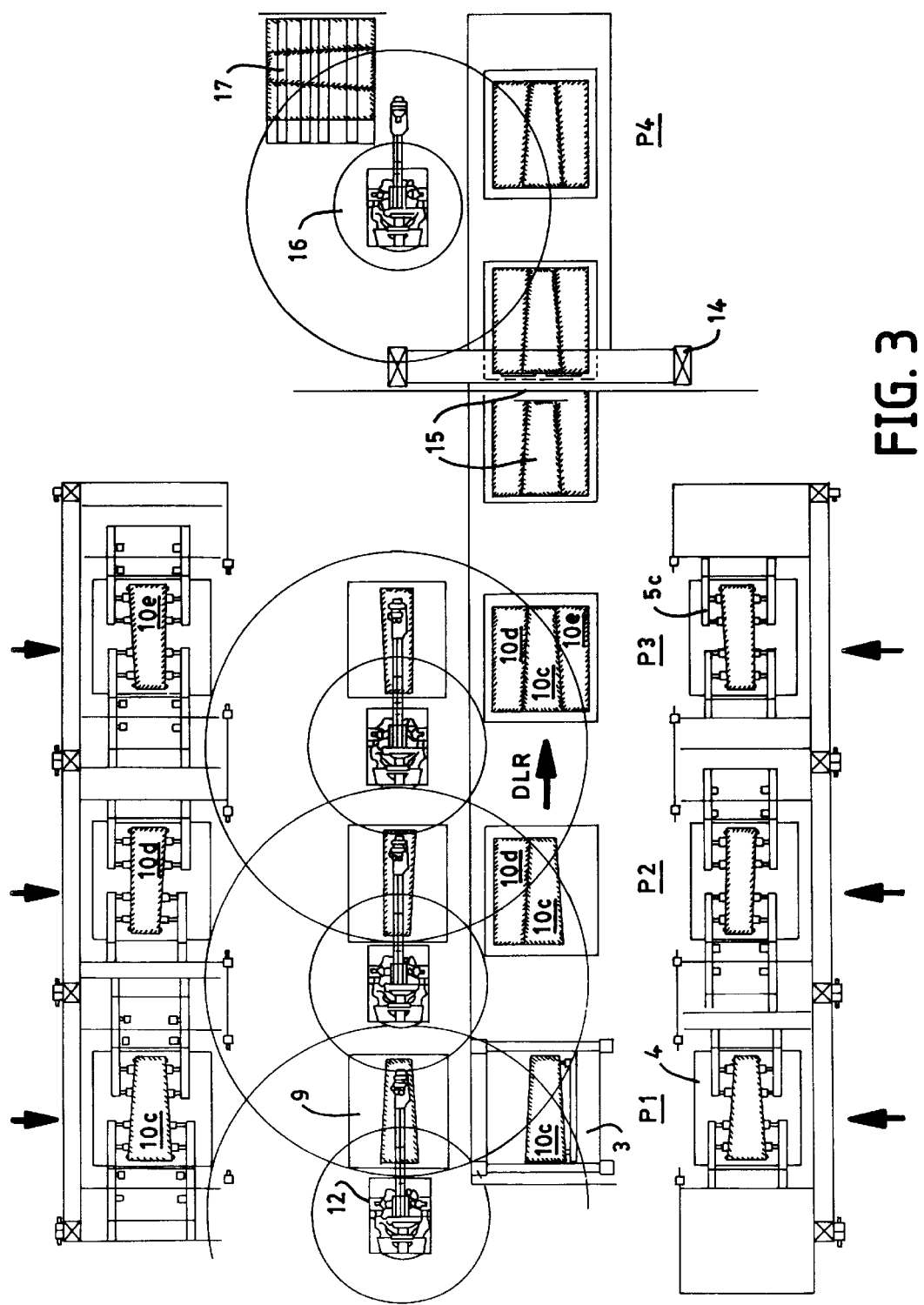

FIG. 3 modified execution style for FIG. 1

Figure 4:
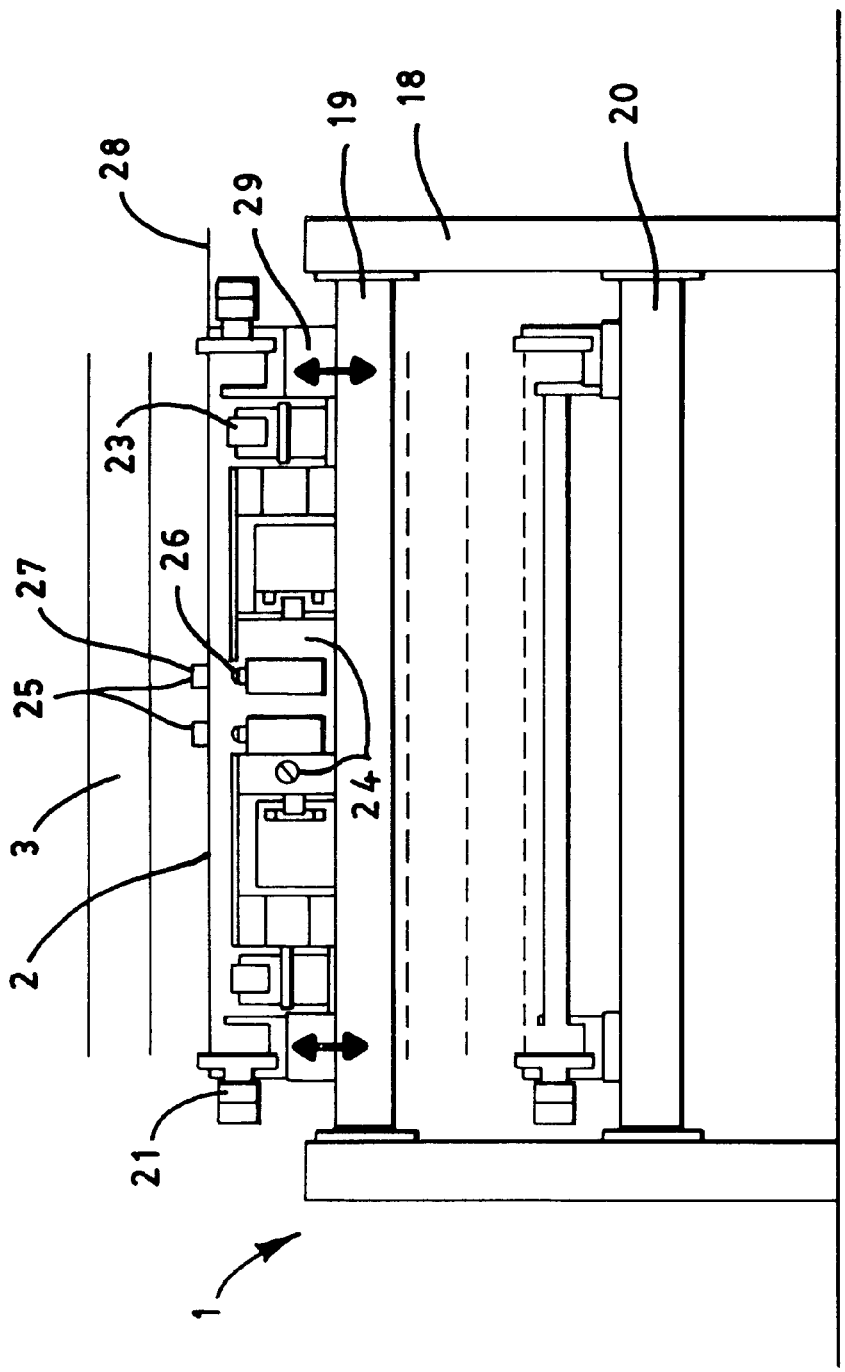

FIG. 4 vertical section through lifting jacks 1,2

Figure 5:
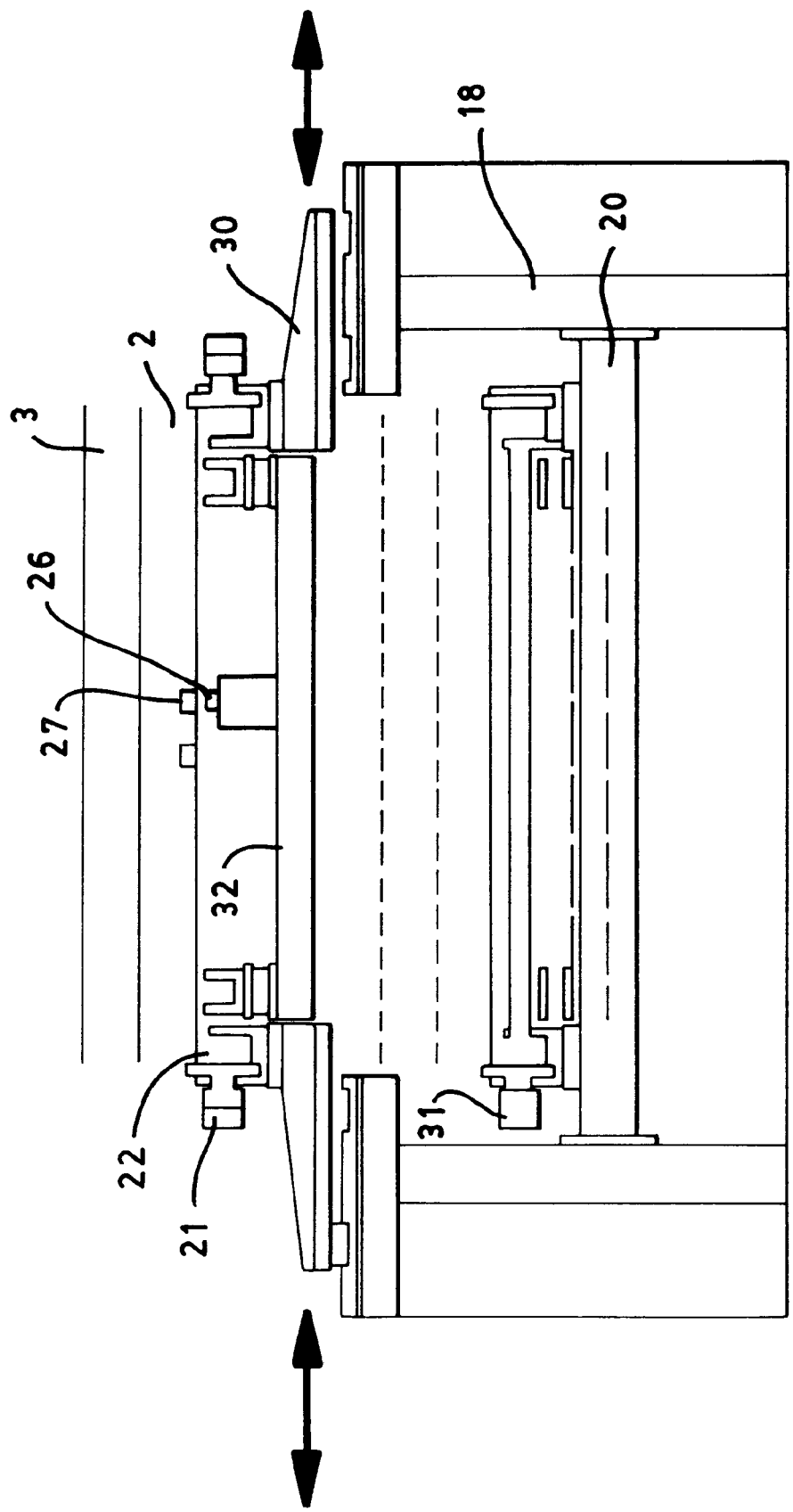

FIG. 5 vertical section through one lifting jack 3,

FIGS. 6a to 6f various sheet metal plate arrangements 10(d) to 10(u) in the way they may be arranged on one carrier each The pallets with the sheet metal plates 10(a) to 10(u) (preliminary sheet metal bars) cut and prepared for welding are deposited by a fork lift truck not illustrated in the direction of the arrow on the relevant stock pile yards 4. Spread magnets 5(a) to 5(c) are set up against the sheet metal plate piles to fix them. From the stock pile yards 4 arranged in the passage direction DLR at left and right from the rotary system 1 the sheet metal plates are alternately picked-up individually by a transverse conveyor 6 (linear portal system) only shown roughly with the support columns, utilizing hoisting devices 7 including suction flame and dumped onto the pre-positioning tables 9 each located in the same transverse plane. Hence, while the sheet metal plates 10 are picked-up from the stock pile yards 4 on the left side, empty pallets can be exchanged for full pallets on the right side of stock pile yards 4. By their deposition on the pre-positioning tables 9 the existing positioning tolerance of sheet metals in X/Y plane is minimized on the one hand and on the other hand the handling cycle of the linear portal system 6 is shortened. In position P1 an empty component part carrier and/or carrier 3 arriving from the bottom and usually connected in a detachable arrangement to a pallet 2 located underneath is stopped and connected through a media coupling not shown here with the magnets to establish an electric connection. In this position P1 an inlay robot 12 as per FIG. 1 for example takes-up the sheet metal plate 10(a) from the pre-positioning table 9 which is then positioned exactly on carrier 3 by the aid of a floating suction frame. For this purpose arrest stops 13 may be existing both stationary and fixed on a carrier to allow for positioning. Sheet metal plates 10 can be positioned and held on carrier 3 either from below by applying known magnetic clamping technology, whereby the permanently magnetic support bed strips are neutralized by a flow of electric current laid-on for insertion of sheet metal plates, and also from above through pneumatically pressed-on clamping strips. On application of the magnetic clamping technology from below the support strips are magnetized after positioning of sheet metal plates 11, thus chucking the sheet metal plates firmly. Afterwards the stickers for fixing the carrier 3 in X/Y/Z direction and the media coupling can be pulled off in order to convey the carrier with the positioned sheet metal plate 10(a) (see FIG. 1) by the aid of the conveyance device 21 on transport rollers 22 to position P2. In this position the sheet metal plate 10(b) from the relevant pre-positioning table 9, like sheet metal plate 10a before, is laid on carrier 3 by the aid of inlay robot 12 and so combined with sheet metal plate 10a that welding can be performed without any change in the position of the two sheet metal plates to each other. Subsequently carrier 3 with the two sheet metal plates 10a and 10b is conveyed up to the welding unit 15, stopped there and lowered by the aid of the vertical hoisting device 29 of the lifting jack H1 from transportation level 289 by approx. 50 mm onto free-wheel rollers 23. Free-wheel rollers 23 are mechanically exactly fabricated because their top edge must ensure the exact height position of sheet metal plates in Z-direction on welding. At this lower plane, carrier 3 is docked-on by the help of centering pins 26 and centering sleeves 27 and a dock-on system 25 to one of the two horizontally movable feed forward axles 24. The dock-on system shall have no play and be extremely precise because the positioning accuracy of sheet metal plates relative to the welding head in X/Y plane is directly influenced thereby. As an alternative to the support bed as described of the pallet 2 connected with carrier 3 in Z-direction on free-wheel rollers 23, it is also feasible to provide for a direct support for pallets 2 on the skid of the horizontal feed forward axle 24. After pallet 2 has been docked-on it is accelerated with the horizontal feed forward axle 24 to the speed required for welding and passed through under the portal-type bridge 14. The welding devices 15 are mounted in movable arrangement at the portal-type bridge at least in Y and Z direction and preferably also around certain pivoting axles. By superposition and/or programming of the speed of the horizontal feed forward axle 24 and by the possible mobility of the welding device 15 it is possible to weld any optional weld seam contour within the maximum dimensions. Immediately after having left the welding zone, pallet 2 with the finish-welded sheet metal plate 11 is disengaged from the horizontal feed forward axle 24 in the area of the lifting jack H2 by raising and conveyed to the take-out position P4. There it is stopped and the welded sheet metal plate 11 is taken from carrier 3 by a take-out robot 16 with a suction frame and passed on for further handling to oil station 17. Following a lateral sliding of the horizontal sliding device 30 towards the outside the empty pallet 2 with carrier 3 will then be lowered with lifting jack 32 by a stroke height reflected by an arrow down to the lower back-transport device 31 and returned to station P1, where it is brought by lifting jack H4 into the take-up position.

FIGS. 4 and 5 additionally designate the carrying rack for the rotary system 1 with number 18, and the upper transverse beam with number 19, and the lower transverse beam with number 20.

Figure 6A:
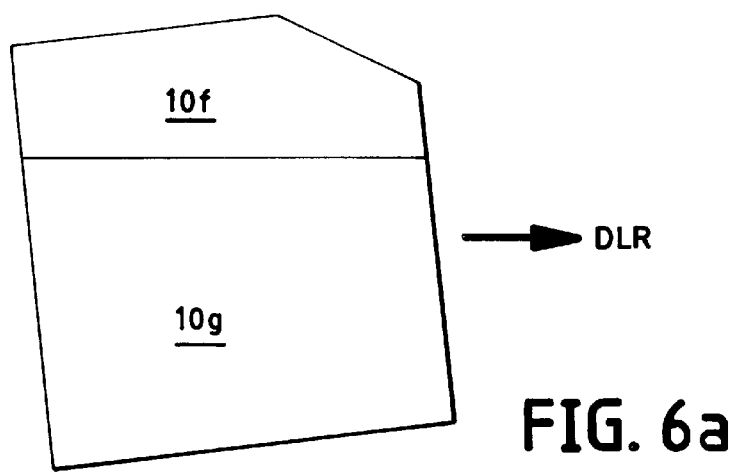
Figure 6B:
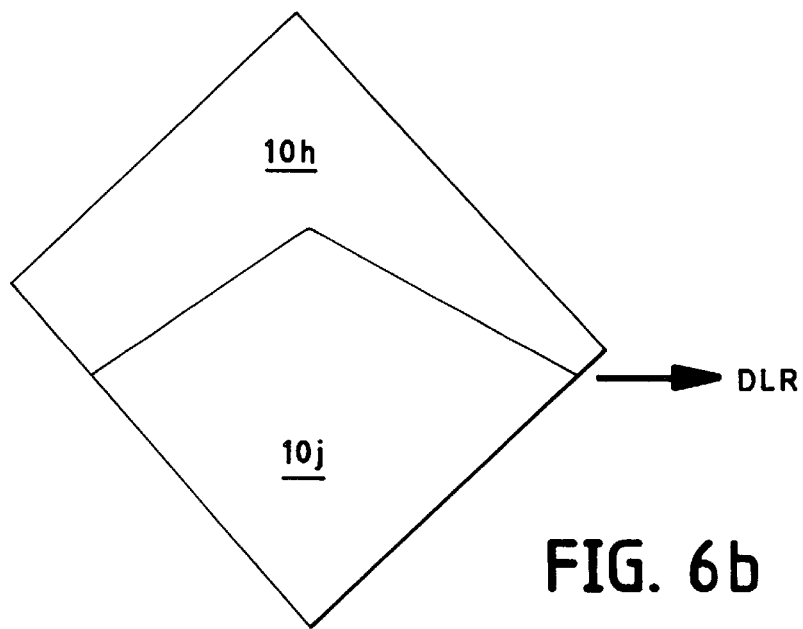
Figure 6C:
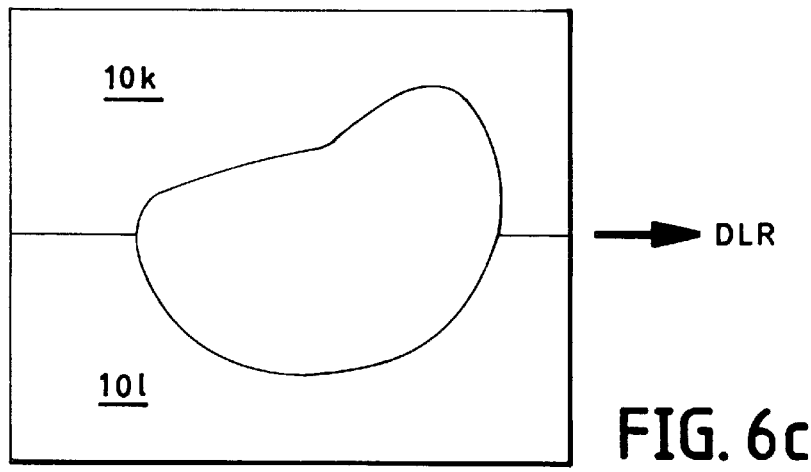
Figure 6D:
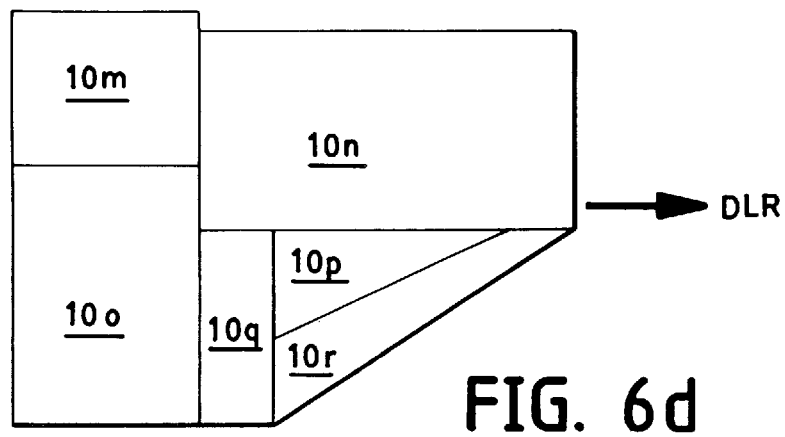
Figure 6E:
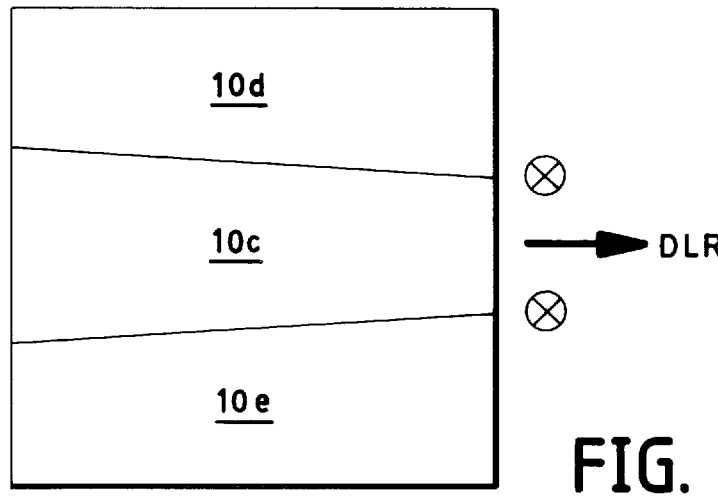
Figure 6F:
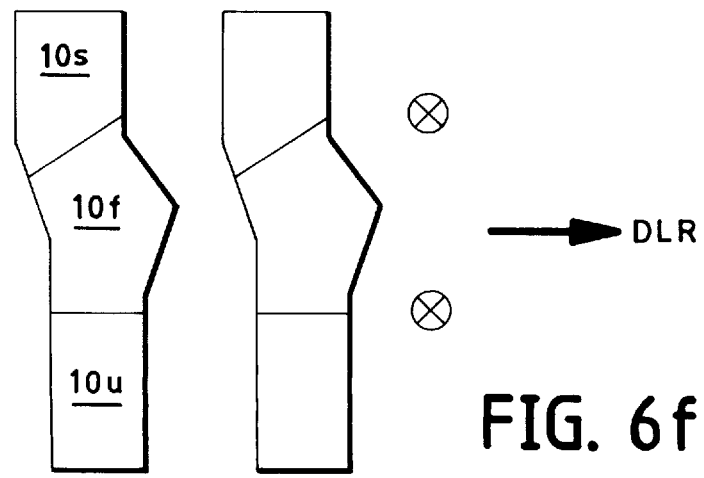

By way of the plant equipment concept being the subject of this invention a maximum flexibility accompanied by a cost-optimized fabrication are realized. It allows for welding sheet metal plates of any thickness or material any sheet metal geometry even seams (see FIG. 6a)

odd seams (see FIG. 6b)

circular or oval seams (see FIG. 6c)

two or more than two sheet metal plates to get one overall plate in one passage (see FIG. 6d)

more than one weld seam with a corresponding number of processing heads in through-passage procedure (see FIG. 3 and FIG. 6e)

sheet metal packages (see FIG. 6f).

The plant equipment has been devised as a flexible concept to allow for follow-up or mixed operation with regard to sheet metal plates and carriers. Pallets 2 may always remain in the plant equipment independently of the sheet metal geometry. Component part carriers 3 may be mounted in detachable arrangement on pallets 2 to allow for their sheet metal specific exchange on demand.

To allow for proper adaptation to various shapes of sheet metal plates to be united by welding it is feasible to mount clamping strips on the carrier which can be arrested. Here it is feasible to process straight or angled seams by manual reversal, applying one clamping technique only, without replacing the carrier. To this end the clamping strips are expediently divided on both sides, with both halves being connected through a pivot bearing with each other, so that any arbitrary angles can be represented in principle.

By utilizing an arbitrarily large number of pre-positioning tables 9 and inlay stations of the same construction style it is feasible to process an arbitrary number of sheet metal plates with one passage to get an overall sheet metal plate bar at a minimum handling cycle time of 12 seconds, for example. Depending on the sheet bar situation a contact cooling through the support strips and both an air or gas cooling as well as a water cooling can be implemented proceeding from the processing head to cool the sheet metal plate during welding procedure. Depending on requirements it is also possible to implement a seam sequence and/or gap sensor system. The quality of welded seams is purposively controlled by known follow-up optical sensors at the upper side of sheet bars in ON-LINE mode proceeding from the processing head.

The pallet rotary system as described can naturally also be implemented in combination with a cutting portal system for contour cutting of sheet metal panels in a manner optimized for ancillary time.

List of References (1) Pallet rotary system
(2) Pallet
(3) Component part carrier and/or carrier for sheet metal plates (10)
(4) Stock pile yard for sheet metal plates to be processed (10)
(5a)–(5c) Spread magnets
(6) Transverse conveyor (linear portal system)
(7) Hoisting device with suction frame
(8) Support columns of (6)
(9) Pre-positioning table for (10)
(10a)–(10u) Sheet metal plates (before welding or cutting)
(11) Sheet metal plates (after welding or cutting)
(12) Inlay robot with floating suction frame
(13) Arrest stops for positioning of (10) on (2)
(14) Portal-type bridge with (15)
(15) Cutting or welding unit (processing installation)
(16) Take-out robot for (11)
(17) Oil station
(18) Carrying rack of (1)
(19) Uppercross beam
(20) Lower cross beam
(21) Conveyance device
(22) Transport rollers
(23) Free-wheel rollers (top edge=transportation on welding)
(24) Feed-forward axles
(25) Dock-on systems for connecting (24) and (2)
(26) Centering pin at (25)
(27) Centering sleeve in (2) for (26)
(28) Transport level of pallets
(29) Vertical hoisting device at (H1) and (H2)
(30) Horizontal sliding device at (H3)
(31) Lower back-conveying device
(32) Hoisting device at (H3)
H1–H4 Lifting jacks
DLR Passage direction from (10)/(11) to (1)
P1–P4 Positions of (10)/(11) in (1)

What is claimed is:

1. Process for transportation of sheet metal plates to a processing installation where the sheet metal plates are worked with tools, the process comprising the steps of:

providing a plurality of support carriers;

positioning and holding a plurality of the sheet metal plates on each of said support carriers in a position to be machined at a charging station;

moving the sheet metal plates fixed on said carriers consecutively with an aid of a conveyer unit upon completion of said positioning and holding on said carrier at at least one of irregular distances and discontinuously up to a position upstream of said processing installation;

moving said carriers through said processing installation one of continuously and at a distance being constant in a direction of conveyance and as small as possible at a speed being dependent upon a processing rate of the processing installation, the processing installation is at least moved transversely to a transportation direction of said sheet metal plates;

processing the plates with the process installation as the plates move through the process installation, said processing being one of cutting and welding along a curve of a cutting line or welding seam at said processing rate in accordance with the curve of an extending cutting line or weld seam;

conveying the sheet metal plates fixed on the carriers after said processing downstream of the processing installation to a take-off device where machined sheet metal plates are taken off from the carrier and where empty carriers are subsequently conveyed back to the charging station.

2. Process according to claim 1, wherein:

more than one cutting line or weld seam are cut or welded continuously during one passage.

3. Process according to claim 1, wherein:

a plurality of said processing installations are moved simultaneously or consecutively in a direction transverse to a direction of transportation of said sheet metal plates side by side or one after another.

4. Process according to claim 1, wherein:

the sheet metal plates to be positioned on a carrier for cutting and welding procedure are each deposited on a pre-positioning table and subsequently deposited by an inlay robot on said carrier and fixed on said carrier.

5. Process according to claim 1, wherein:

a plurality of processing installations are either moved simultaneously side by side or are moved consecutively one after another.

6. Process for transportation of plates through a processing unit, the process comprising the steps of:

providing a plurality of carriers;

mounting a plurality of the plates in a processing position on each of said carriers at a charging station;

moving each of said plurality of carriers independently of each other to a synchronizing position upstream of the processing unit after the plates are mounted in said processing position;

moving said plurality of carriers from said synchronizing position through the processing unit at a synchronous rate corresponding to a processing rate of the processing unit, said synchronous rate being independent of said moving of said carriers upstream of said synchronizing position;

moving said processing unit perpendicular to a direction of said carriers moving through the processing unit;

performing an operation on the plates in said processing position on each of said carriers at the processing unit;

moving said carriers from the processing unit to a take-off position;

removing the plates from each of said carriers at said take-off position;

moving said carriers from said take-off position to said charging position.

7. The process in accordance with claim 6, wherein:

said moving of said carriers at said synchronous rate includes positioning said carriers relative to each other to minimize a distance between said carriers.

8. The process in accordance with claim 6, wherein:

said moving of said carriers at said synchronous rate includes positioning said carriers at a minimum distance between each other for the processing unit to substantially continuously operate on the plates.

9. The process in accordance with claim 6, wherein:

said moving of said carriers at said synchronous rate includes positioning said carriers relative to each other at a minimum distance for the processing unit to operate substantially continuously.

10. The process in accordance with claim 6, wherein:

said moving of said carriers to said synchronous position and said moving of said carriers at said synchronous rate is performed to have more than one of said carriers dam-up consecutively upstream of the processing unit.

11. The process in accordance with claim 6, wherein:

said moving of said carriers to said synchronous position and said moving of said carriers at said synchronous rate is performed to have more than one of said carriers dam-up consecutively upstream of said synchronizing position.

* * * * *